United States Patent [19]

Cichoski et al.

[11] Patent Number: 4,930,833
[45] Date of Patent: Jun. 5, 1990

[54] BOOT COVER FOR A CONVERTIBLE VEHICLE

[75] Inventors: Richard Cichoski, Sterling Heights; Michael Kilpinen, Northville, both of Mich.

[73] Assignee: ASC Incorporated, Mich.

[21] Appl. No.: 319,320

[22] Filed: Mar. 3, 1989

Related U.S. Application Data

[63] Continuation-in-part of Ser. No. 100,530, Sep. 24, 1987, abandoned.

[51] Int. Cl.$^5$ .............................................. B60J 7/20
[52] U.S. Cl. ................................... 296/136; 296/100; 428/319.7
[58] Field of Search ................ 296/100, 136; 160/19, 160/383, DIG. 17; 428/319.3, 319.7, 319.9; 24/602, 662, 664, 618, 555, 587

[56] References Cited

U.S. PATENT DOCUMENTS

| 3,222,103 | 12/1965 | Wernig et al. | 296/136 |
| 3,223,446 | 12/1965 | Coppock et al. | 296/136 |
| 3,954,537 | 5/1976 | Alfter et al. | 156/82 |
| 4,639,033 | 1/1987 | Wheatley et al. | 160/327 X |

FOREIGN PATENT DOCUMENTS 862022  3/1961  United Kingdom ................. 24/587

Primary Examiner—Dennis H. Pedder
Attorney, Agent, or Firm—William D. Blackman; Arnold S. Weintraub

[57] ABSTRACT

A snapless boot cover for the storage compartment of a convertible-type vehicle has a laminated main body portion which fits over the compartment. A grommet is secured to the main body portion by a U-shaped hinge portion and has a pair of opposed resilient lips which form a channel therebetween. A continuous bead formed in the storage compartment fits within the channel and cooperates with the grommet to provide a snapless retainer boot cover.

8 Claims, 2 Drawing Sheets

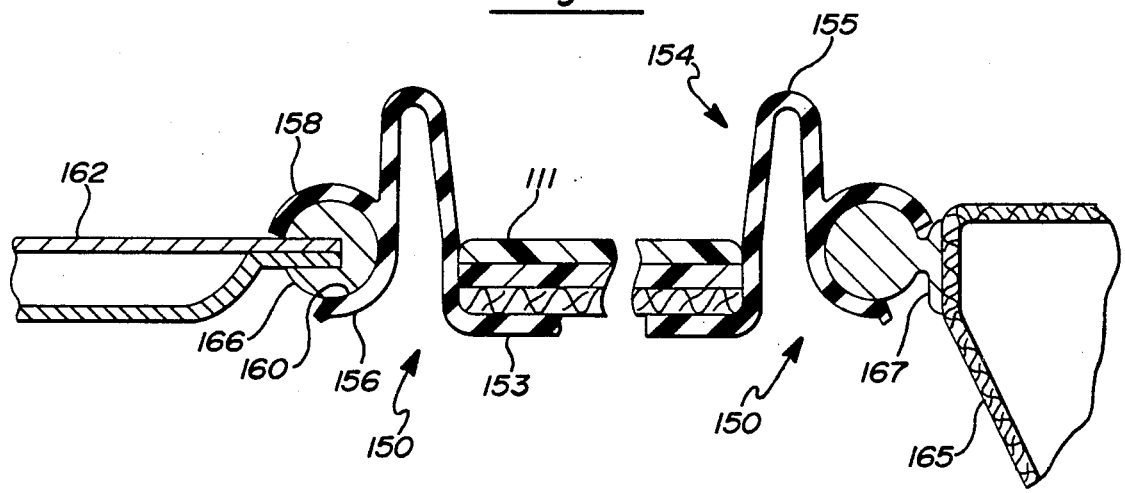

BOOT COVER FOR A CONVERTIBLE VEHICLE

This application is a continuation-in-part of U.S. patent application Ser. No. 100,530, filed Sept. 24, 1987, now abandoned, the disclosure of which is hereby incorporated by reference herein.

BACKGROUND OF THE INVENTION

1. Field of the Invention

The present invention relates to automotive vehicles and, in particular, to convertible-type automotive vehicles. Even more particularly, the present invention concerns boot covers and other decorative appliances for automotive vehicles.

2. Background of the Invention

With renewed interest in convertible-type automobiles the marketplace has endeavored to meet the demand with an ever-increasing amount of new approaches to the design and appearance of same. However, one area of which little or no attention has been paid is the "boot" or "tonneau" cover. As is known to those skilled in the art to which the present invention pertains, there is a well or storage compartment located between the rear of the back seat and the trunk compartment of a convertible vehicle. Typically, a piece of cloth, which has come to be known as a "boot" or "tonneau" cover is snap-fitted into receptors over the storage compartment or well area.

Generally, the fabric cover is not aesthetically pleasing and is difficult to store. Also, due to climatic conditions the fabric deteriorates, and bleaches out from the sun, and also changes shape, resulting in a tight fit or a failure to fit after a certain amount of time.

Furthermore, the fabrics require manual assembly in placing the panels together and in attaching the snaps thereto. Thus, there is a need for an improved boot cover which overcomes the difficulties encountered in the prior art and which eliminates much of the manual labor encountered in the manufacturing thereof. Furthermore, there exists a need for a boot cover which reduces or eliminates the need for snaps since many users find them difficult to handle.

SUMMARY OF THE INVENTION

In accordance with the present invention there is provided a boot cover for an automotive vehicle which, generally, comprises a laminated product having a "memory", which permits the boot cover to be folded and compressed into a compact size when not in use and which returns to its original configuration when unfolded.

The boot cover hereof, generally, may comprise a first layer of a stretch or knitted polyester, an intermediate layer of a cross-linked polyethylene and a third layer of a supported vinyl.

In forming the boot cover hereof, the layers are flame laminated and, then, compressed in a roller assembly to bond the layers together to form a blank. By flame laminating, the surfaces of the polyethylene are melted, and upon the subsequent cooling thereof, the polyethylene surfaces bond to the polyester and the vinyl to form a unitary product.

After the blank is formed it is then heated and compressed in a matched mold to form the boot cover. The thus formed "memory" vinyl then has a border molding secured thereto. The border molding, which is preferably formed from an extruded vinyl, has a hinge formed therein which is extensible and retractable, and also has a pair of of continuous opposed lips or flanges which sealingly engage a continuous bead along an edge of the well of the vehicle. The lips, upon engagement with the bead, form an essentially snapless tonneau cover.

For a more complete understanding of the present invention reference is made to the following detailed description and accompanying drawing. In the drawing, like reference characteristics refer to like parts throughout the several views in which:

BRIEF DESCRIPTION OF THE DRAWINGS

FIG. 4 is a cross-sectional view of a second embodiment of the present invention.

DETAILED DESCRIPTION OF THE PREFERRED EMBODIMENT

Figure 1:
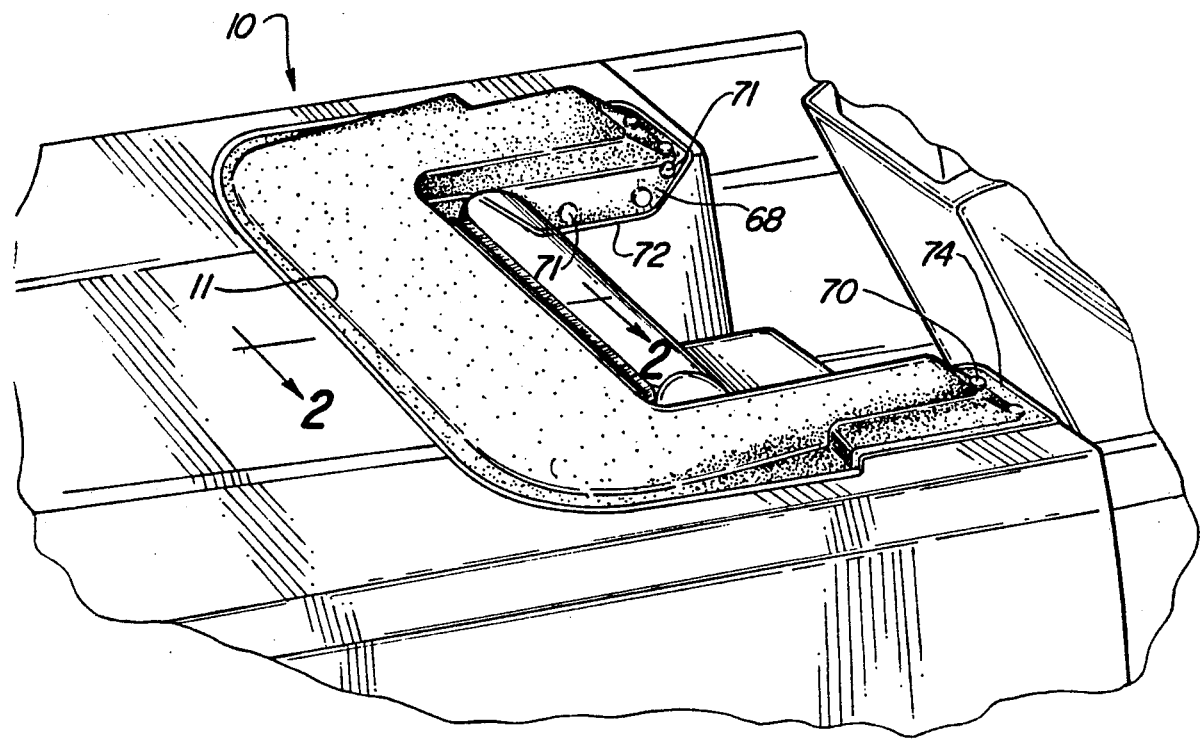
FIG. 1 is a perspective view of a boot cover in accordance with the present invention.
Figure 2:
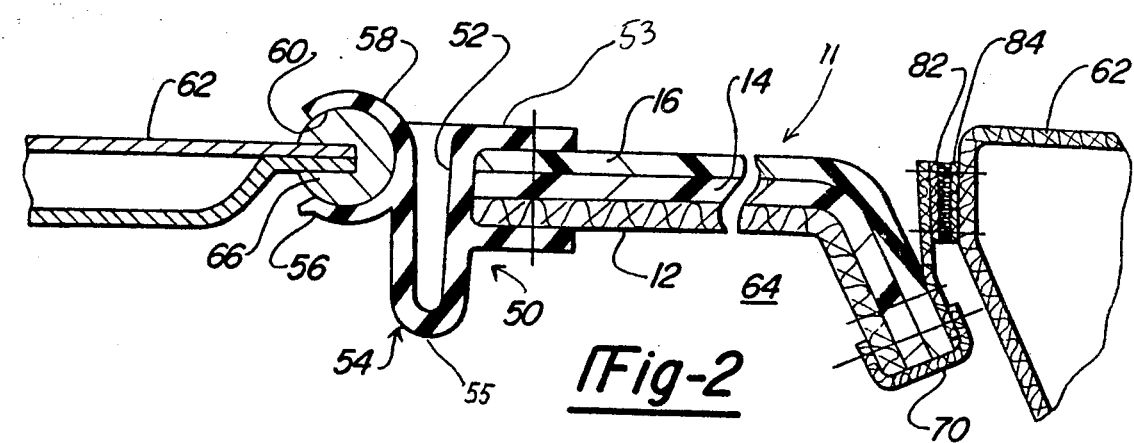
FIG. 2 is a cross-sectional view taken along 2—2 of FIG. 1.

Referring now to FIGS. 1-2 there is depicted therein a boot cover in accordance with the present invention and, generally, denotes at 10. As is known to those skilled in the art to which the present invention pertains, a boot cover fits over the storage compartment for a convertible top formed in an automobile (not shown) when the top is "down" or retracted. The boot cover 10 hereof can be manufactured and dimensioned to fit over this type of storage compartment for any convertible automobile.

Referring, again, to the drawing, to boot cover 10 hereof, has a main body portion 11 which, generaly, comprises a laminated structure having a first layer 12, an intermediate layer 14 and a third or exterior layer 16.

The first or interior layer 12 is a knitted, two-way stretchable synthetic fiber. Ordinarily, a suitable fiber of the type contemplated for use herein is a polyester.

The class of polyester utilized herein are thermoset, linear compositions. The polyester contemplated for use herein is a polyethylene terephthalate which, is generally, prepared from the reaction of ethylene glycol and terephthalic acid. This reaction is well-known to one of ordinary skill in the art. A particularly preferred polyester for use herein is that sold by Milliken & Co., under the name VISA.

The intermediate layer 14 is a cross-linked polyalkylene, such as polyethylene, polypropylene, polybutylene and the like. These polymeric compositions, which are employed as a woven fabric thereof, are prepared by conventional polymerization techniques. For example, polyethylene is ordinarily prepared by either (a) a high pressure polymerization of ethylene in the present of a radical initiator, such as a peroxide or (b) a lower pressure polymerization of ethylene in the presence of a heavy-metal oxide or Ziegler-type catalyst. Polypropylene is, generally, prepared by the polymerization of propylene in the presence of a Ziegler-type catalyst and an inert hydrocarbon solvent. Polybutylene, etc. is formed by techniques well known to the skilled artisan.

In the practice of the present invention, the preferred polyalkylene is a cross-linked polyethylene. Cross-linked polyethylene is, generally, prepared by polymerizing polyethylene in the presence of a minor amount of a cross-linking agent, such as, maleic acid, acrylic acid or the like.

In practicing the present invention, a particularly preferred polyester is a commercially available cross-linked polyester sold by Dynamic-Nobil under the name XJ400 Natural Trocellen, which is defined as a closed-cell, cross-linked polyethylene foam.

The third or outer layer 16 is a nylon supported vinyl. This is commercially available product from Uniroyal, Inc. which is defined as a vinyl film supported with a stretch nylon backing.

In first forming the boot, the three materials are flame laminated together at a temperature of about 325° F. to about 375° F. and, thereafter, passed between rollers to bond the layers together to form a blank.

The lamination of these three materials to form a tri-layered fabric, per se, is known and such a fabric is commercially available from Rotoplastics in Adrian, Michigan.

Thereafter, the three bonded layers 12, 14 and 16 are molded in a matched mold into the desired configuration. The molding occurs at a temperature of about 315° F. in a compression mold. This temperature causes the laminate to soften and be moldable. The mold is ordinarily maintained at a pressure of from about 40 to 75 psi. The resulting boot has a "memory" which enables the boot cover to be folded into any desired configuration upon storing and which returns to its original molded shape in usage.

Referring, again to the drawing, a border molding 50 is secured to the rear edge of the main body portion 11. The molding 50 is integrally formed as a single piece and is secured to an edge of the body portion 11 by any suitable method such as by sewing, gluing, sonic welding or the like.

The molding 50 has a first edge 52 which is secured to the rear edge of the main body portion 11 such as by sewing or the like and is substantially co-extensive therewith. The edge 52 may have one or more attaching flaps 53 extending substantially horizontally therefrom.

The molding 50 also includes a central portion or hinge 54 which is co-extensive with the edge 52. The hinge 54 is substantially U-shaped in cross section as shown in FIG. 2 and extends downwardly from the first edge 52 to a lowermost extension 55 thereof and then extends upwardly to join with a pair of opposed lips as described hereinbelow. The inclusion of this hinge 54 in the molding 50 allows for some stretchability thereof and gives some extra "flex" to the cover 10 as a whole to help take up for warpage or change of shape due to weathering of the cover 10. This molding 50 having the hinge 54 formed therein thus allows for longer viability of the cover 10 over time. The hinge 54 is extensible and retractable for allowing flexibility to the molding and, thus, to the boot cover 10.

A pair of opposed lips 56, 58, project from the hinge 54 and are co-extensive therewith. The opposed lips 56, 58 define a channel 60 therebetween. As is subsequently described, the channel 60 engages a bead 66 attached to an edge of the storage compartment to retain the boot cover 10 in position over the storage compartment. This arrangement of the opposed lips 56, 58 serves for disengagably retaining a bead 66 therein and provides a means for disengagably attaching the border molding 50 to a surface of the vehicle 62 adjacent the convertible top storage compartment 64.

The molding 50 is formed from any suitable resilient matter which enables the opposed lips to exhibit sufficient compression on a bead to retain the boot cover in position. Preferably, the bead 66 is formed from an extruded duo-durometer polyvinyl which exhibits sufficient resiliency to be efficacious herein.

As shown in the drawing, a vehicle 62 has a convertible top storage compartment 64 formed therein. A continuous peripheral bead 66 is secured to the sheet metal of the vehicle within the interior of the compartment. The bead 66 has a diameter slightly greater than the diameter of the channel 60. Because of the resiliency of the lips 56, 58, they can be fitted around the bead, and retained therearound, while easily removed therefrom.

Furthermore, because of the "soft" nature of the main body portion 11 and the molding 50, when not in use the boot cover can be fold up and stowed. Because of the memoried nature of the main body portion 11 and the molding 50, upon unfolding the boot cover returns to its original configuration.

Figure 3:
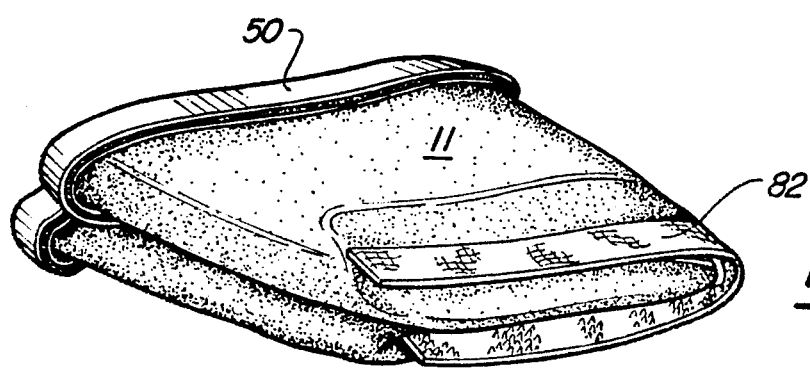
FIG. 3 is a perspective view showing the boot cover in a folded position.

As shown in FIG. 2, the forward edge 70 of the boot cover 10 may be secured to the vehicle 62 by any suitable mode, such as a complementary molding and bead assembly or the like. In the embodiment of FIGS. 2-3, the forward edge 70 has a VELCRO hook and loop attaching strip 82 secured thereto such as by sewing or the like. A complimentary VELCRO attaching strip 83 is secured to the interior of the storage compartment 64, as shown.

Referring now to FIG. 4, a second embodiment of a boot cover is illustrated in cross-section from a viewpoint perspective similar to that of FIG. 2.

In the embodiment of FIG. 4, a border molding 150 is secured to a main body portion 111 along an outer edge thereof by appropriate method such as sewing, gluing or the like. The main body portion 111 is substantially identical to the main body portion 11 described hereinabove, and may be formed from the type of tri-layered fabric previously described, although other material such as vinyl, canvas, waterproofed fabric, etc. may be used. The molding 150 is formed from a resilient material such as, e.g., a flexible plastic or suitable elastomeric material, and in this embodiment extends around substantially the entire periphery of the main body portion 111. For this reason, the molding 150 appears twice in the cross-sectional view of FIG. 4. The molding 150 is preferably molded as a unit.

In the embodiment of FIG. 4, the molding 150 includes an attaching flap 153 which attaches the molding to the main body portion 111, and is attached thereto by gluing, sewing, or other appropriate means. From the attaching flap 153, the molding 150 extends upwardly to an uppermost extension 155 thereof, and then turns and extends downwardly and separates into a pair of opposed resilient lips 156, 158 which define a channel 160 therebetween. In this embodiment, a first bead 166 is attached to an edge of the vehicle 162 adjacent the storage compartment and a second bead 167 is attached to the back of the vehicle seat 165 by sewing or other appropriate means of attachment. This upward extension and return of the molding 150 again forms a hinge 154 allowing the molding to "flex" and to self-adjust for warpage or shrinkage of the main body portion 111.

In the embodiment of FIG. 4, the molding 150 is formed with the lips 156, 158 oriented downwardly at an angle for ease of installation and removal of the boot cover 10. While not critical to the present invention, this angle may be 20°-45° depending on the application and characteristics of the vehicle.

Ordinarily, a boot cover is secured not only to the storage compartment, but to the quarter panels of the vehicle. Herein, as seen in FIG. 1, the boot cover 10 may be provided with extension flaps 68, 70 which are secured to the main body portion by any suitable mode such as by sewing or the like, or may be integrally formed as part of the main body 11.

The undersurfaces 72, 74 of the flaps 68, 70, respectively, may have conventional snaps 71 secured thereto which can then be fitted into receptors affixed to the quarter panels, pillar posts or the like. Of course, such convertible snaps can be otherwise disposed on the boot cover. It is to be appreciated, through, that such snaps need not be present and that the present invention provides an essentially "snapless" boot cover.

Although the present invention has been described herein with respect to specific embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. A boot cover for covering a convertible top storage compartment of a convertible-type vehicle, comprising:
   (a) a main body portion;
   (b) a border molding attached to an edge of the main body portion, the border molding comprising:
      (1) an attaching flap;
      (2) a hinge portion extending from the attaching flap and which is extensible and retractable to allow flexibility to the molding, the hinge portion comprising a substantially U-shaped cross-section; and
      (3) means for disengagably attaching the molding to a surface of a convertible-type vehicle adjacent a convertible top storage compartment.

2. A boot cover for covering a convertible top storage compartment of a convertible-type vehicle, comprising:
   (a) a main body portion;
   (b) a border molding attached to an edge of the main body portion, the border molding comprising:
      (1) an attaching flap;
      (2) means for disengagably attaching the molding to a surface of a convertible-type vehicle adjacent a convertible top storage compartment; and
      (3) a hinge portion extending from the attaching flap and which is extensible and retractable to allow flexibility to the molding, the hinge portion extending downwardly from the attaching flap to a lowermost extension thereof and thence upwardly and being connected to the means for disengagably attaching.

3. A boot cover for covering a convertible top storage compartment of a convertible-type vehicle, comprising:
   (a) a main body portion;
   (b) a border molding attached to an edge of the main body portion, the border molding comprising:
      (1) an attaching flap;
      (2) means for disengagably attaching the molding to a surface of a convertible-type vehicle adjacent a convertible top storage compartment; and
      (3) a hinge portion extending from the attaching flap and which is extensible and retractable to allow flexibility to the molding, the hinge portion extending upwardly from the attaching flap to an uppermost extension thereof, and thence downwardly and being connected to the means for disengagably attaching.

4. In a convertible type vehicle of the type having a storage compartment for stowing a convertible top when in its retracted position, the improvement which comprises:
   a boot cover for the storage compartment, the boot cover comprising:
   (a) a main body portion;
   (b) a border molding attached to an edge of the main body portion, the border molding comprising:
      (1) an attaching flap;
      (2) a hinge portion extending from the attaching flap and which is extensible and retractable for allowing flexibility to the molding, the hinge portion comprising a substantially U-shaped cross-section; and
      (3) means for disengagably attaching the molding to a surface of a convertible-type vehicle adjacent the convertible top storage compartment.

5. The improvement of claim 4 wherein:
the main body portion comprises a three-layered laminate.

6. The boot cover of claim 1 wherein:
the main body portion comprises a three-layered laminate.

7. The boot cover of claim 1 wherein the means for disengagably attaching comprises:
a pair of opposed resilient lips extending from the hinge portion which define a channel therebetween for disengagably retaining a bead therein.

8. The improvement of claim 4 wherein the means for disengagably attaching comprises:
a pair of opposed resilient lips extending from the hinge portion which define a channel therebetween for disengagably retaining a bead therein.

* * * * *